(12) United States Patent
Morikawa et al.

(10) Patent No.: US 7,903,515 B2
(45) Date of Patent: Mar. 8, 2011

(54) OPTICAL DISC DRIVE

(75) Inventors: Kenichi Morikawa, Osaka (JP);
Hiroshige Ishibashi, Osaka (JP);
Takahiro Sato, Osaka (JP); Yasuhiro Tai, Osaka (JP); Yoshiyuki Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 12/256,675

(22) Filed: Oct. 23, 2008

(65) Prior Publication Data

US 2009/0109820 A1   Apr. 30, 2009

(30) Foreign Application Priority Data

Oct. 24, 2007   (JP) ................................. 2007-276210

(51) Int. Cl.
*G11B 7/00* (2006.01)
(52) U.S. Cl. .................. 369/53.2; 369/53.19; 369/44.32; 369/44.27
(58) Field of Classification Search .................. 369/53.2, 369/53.19, 44.32, 44.25, 44.27, 94
See application file for complete search history.

(56) References Cited

U.S. PATENT DOCUMENTS

| | | | | |
|---|---|---|---|---|
| 6,115,333 | A * | 9/2000 | Igarashi ..................... | 369/44.27 |
| 7,224,645 | B2 * | 5/2007 | Ando et al. ................ | 369/53.19 |
| 7,277,372 | B2 * | 10/2007 | Watanabe et al. .......... | 369/44.27 |
| 2004/0037197 | A1 * | 2/2004 | Fujiune et al. .................. | 369/94 |
| 2004/0052165 | A1 * | 3/2004 | Kuribayashi et al. ...... | 369/13.27 |
| 2004/0095860 | A1 * | 5/2004 | Ariyoshi et al. ........... | 369/53.22 |
| 2005/0078574 | A1 * | 4/2005 | Wada et al. ................ | 369/53.19 |
| 2006/0280082 | A1 * | 12/2006 | Yasukawa ................... | 369/53.2 |
| 2007/0070850 | A1 | 3/2007 | Watanabe et al. | |
| 2008/0062851 | A1 * | 3/2008 | Hayashi ................... | 369/112.24 |
| 2008/0084796 | A1 * | 4/2008 | Kawasaki et al. .......... | 369/44.14 |
| 2008/0089194 | A1 * | 4/2008 | Matsuzaki et al. ......... | 369/44.32 |
| 2009/0034399 | A1 * | 2/2009 | Hosokawa et al. ....... | 369/112.23 |
| 2009/0109811 | A1 * | 4/2009 | Tomita et al. .............. | 369/44.32 |

FOREIGN PATENT DOCUMENTS

JP   2007-122850   5/2007

* cited by examiner

*Primary Examiner* — Thang V Tran
(74) *Attorney, Agent, or Firm* — Renner, Otto, Boisselle & Sklar, LLP

(57) ABSTRACT

An optical disc drive according to the present invention can read data from any of multiple types of optical discs, of which the information storage layers are located at mutually different depths under their surface. When this drive is loaded with an optical disc, the servo controller of the drive changes a first type of drive signal to adjust a focus position by changing distances from the lens to the disc and/or a second type of drive signal to adjust tilt of the lens by changing the angles defined by the lens with respect to the disc a number of times, thereby changing settings to be determined by a combination of the focus position and the tilt. A signal quality rater measures multiple index values to rate the quality of a reflected light signal as the settings are changed. Then, the optical disc drive recognizes the type of the given optical disc based on those index values and reads data from the optical disc recognized.

8 Claims, 11 Drawing Sheets

OPTICAL DISC DRIVE

BACKGROUND OF THE INVENTION

1. Field of the Invention

The present invention relates to an optical disc drive for reading and/or writing data from/on a disklike information storage medium (which will be referred to herein as an "optical disc"). More particularly, the present invention relates to an optical disc drive that can recognize the type of the given optical disc as one of multiple different types.

2. Description of the Related Art

Recently, various types of optical discs, including CDs (compact discs), DVDs (digital versatile discs) and BDs (Blu-ray discs), have become immensely popular.

The characteristics of these optical discs change from one type to another. Examples of those varying characteristics include a reflectance (i.e., the ratio of the intensity of light reflected from an optical disc to that of the light incident on that optical disc) characteristic, a wobble characteristic (i.e., the periodic spiral wobbled pattern that has been engraved on the surface of the disc), and a focus error signal (i.e., a control signal for use to control the position of an objective lens perpendicularly to an information storage layer such that the focal point of a light beam is always located right on the information storage layer) characteristic.

To read and write information from/on various types of optical discs, a so-called "disc type recognition" process for recognizing the type of the optical disc that is currently loaded in the optical disc drive needs to be carried out.

The disc type recognition can get done by utilizing the difference in characteristic between those optical discs. For example, the optical disc drive may recognize the type of the given optical disc by measuring the reflectance, the wobble period and/or the amplitude of the focus error signal of the optical disc as described above.

Among those various optical discs, a BD, for example, has a spherical aberration problem. It is known that once a spherical aberration has occurred, the quality of the read or written data deteriorates. Thus, an optical disc drive compliant with the same BD standard has a mechanism for correcting a spherical aberration.

FIG. 1 illustrates a state in which the spherical aberration has occurred. As used herein, the "spherical aberration" refers to a phenomenon that the focal point of a light beam that has passed through a center portion of an objective lens 101 as indicated by the dashed lines shifts along the optical axis from that of a light beam that has passed through a peripheral portion of the objective lens 101 as indicated by the solid line. It should be noted that the "spherical aberration" sometimes means the magnitude of shift between the respective focal points of the light beams as indicated by the dashed and solid lines in FIG. 1, not the phenomenon itself.

The magnitude of the spherical aberration changes due to various factors. Examples of such factors include the wavelength of the light beam, the numerical aperture (NA) of the objective lens, and the depth or distance from the surface of the optical disc on which the light beam is incident to the information storage layer (which will be referred to herein as the "depth of the information storage layer as measured from the surface"). Even if optical discs have been made compliant with the same BD standard, the depth of the information storage layer as measured from the surface may slightly vary (within the range tolerated by the standard) from one disc to another, or the optical discs may have a very small tilt angle with respect to the optical axis. Even so, the magnitude of the spherical aberration still changes significantly. That is why when information needs to be read or written from/on an optical disc in which the quality of the read or written data is easily affected by the spherical aberration, the optical disc drive should perform a spherical aberration correction process.

For example, the optical disc drive disclosed in Japanese Patent Application Laid-Open Publication No. 2007-122850 includes a spherical aberration correcting mechanism (or correcting section) between a light source that emits a light beam and an objective lens that converges the light beam. The spherical aberration correcting section is controlled differently according to the type of the given optical disc, thereby minimizing the magnitude of the spherical aberration (i.e., optimizing the magnitude of spherical aberration correction) and getting the correction process done. Furthermore, the optical disc drive disclosed in that patent document detects the ratio of variation in signal level between multiple spherical aberration states by changing the settings of the spherical aberration correcting section, thereby carrying out the disc type recognition process without being affected by any variation in distance from the disc surface to the information storage layer or by the recording state of the optical disc.

To determine whether or not the given optical disc is a type that would produce spherical aberration and thereby ensure good signal quality, an optical disc drive including such a spherical aberration correcting mechanism as the one disclosed in Japanese Patent Application Laid-Open Publication No. 2007-122850 as a piece of hardware has been used in the prior art. However, the addition of such a mechanism would cause an increase in the manufacturing cost of the optical disc drive. DVD and CD optical systems for optical disc drives, among other things, recently require cost-reduced mechanisms in most cases. That is why it is not beneficial to add such an expensive mechanism that would increase the overall cost.

The specifications of those various types of optical discs have been defined one after another compliant with their associated standards. Meanwhile, a non-standardized optical disc called "Dual Disc" has also been put on the market and has already gained some popularity. Thus, measures should also be found to play such optical discs properly, too.

Specifically, a dual disc is a read-only optical disc including an information storage layer compliant with the DVD standard (which will be referred to herein as a "DVD side") and another information storage layer, on which data of a compact disc is recorded, (which will be referred to herein as a "CD side"). Such a dual disc is fabricated by bonding a substrate with the DVD side and a substrate with the CD side together.

FIG. 2A illustrates how to read data from a CD compliant with the CD standard (which will be referred to herein as a "normal CD"). On the other hand, FIG. 2B illustrates how to read data from the CD side of a dual disc 201.

In the normal CD 200 shown in FIG. 2A, the light beam that has passed through an objective lens 101 is focused on an information storage layer 203. The distance from the surface of the CD 200 to the information storage layer 203 is approximately 1.1 mm and the in-focus state defined by the standard is realized.

On the other hand, in the dual disc shown in FIG. 2B, the light beam that has passed through the objective lens 101 is not focused on the CD side 202. This is because the distance from the disc surface to the CD side 202 is approximately 0.9 mm, which is shorter than that of the normal CD 200 and is not compliant with the CD standard.

That is why if the user tried to read data from the CD side 202 of the dual disc 201 without changing the settings for the normal CD 200, then the light beam would not be focused on the information storage layer 202 and spherical aberration would be produced, thus deteriorating the resultant signal quality. Thus, it should be difficult to read the information as intended.

Furthermore, it is also known that due to the difference in the depth of the information storage layer as measured from the disc surface, not just the spherical aberration but also astigmatism and coma aberration are produced as well and also constitute factors that would cause the degradation of signal quality.

To guarantee that data can be read accurately enough even from such an optical disc, of which the information storage layer is located at a different depth from the standardized one as measured from the disc surface and which will produce various types of aberrations, some measures need to be taken to improve the signal quality. In that case, the overall cost of the optical disc drive needs to be cut down without using any mechanism that will increase the cost significantly just like the one disclosed in the patent document mentioned above.

In order to overcome the problems described above, the present invention has an object of providing an optical disc drive that can determine whether or not the given optical disc is a type to produce a spherical aberration, and that can ensure high signal quality without using such an expensive and bulky mechanism for correcting the spherical aberration.

SUMMARY OF THE INVENTION

An optical disc drive according to the present invention can read data from any of multiple types of optical discs, of which the respective information storage layers are located at mutually different depths as measured from their surface. The drive includes: a light source for emitting a light beam; a lens for converging the light beam; a photodetector, which receives the light beam that has been reflected from the information storage layer of a given optical disc and outputs a reflected light signal; a servo controller for generating a first type of drive signal to adjust a focus position by changing distances from the lens to the optical disc and a second type of drive signal to adjust tilt of the lens by changing the angles defined by the lens with respect to the optical disc; and a signal quality rater for measuring an index value based on the reflected light signal to rate the quality of the reflected light signal. When the drive is loaded with the optical disc, the servo controller changes multiple drive signals of the first and/or second type (s), thereby changing settings to be defined by a combination of the focus position and the tilt. The signal quality rater measures multiple index values as the settings are changed. And the drive recognizes the type of the given optical disc by the multiple index values and reads data from the optical disc recognized.

In one preferred embodiment, the multiple types of optical discs may include a first type of optical disc, which is standardized, and a second type of optical disc. In a situation where the smaller the index value, the higher the rating of the signal quality, if the largest one of the index values measured is equal to or smaller than a first threshold value, the optical disc drive may recognize the given optical disc as the first type. The servo controller may change at least one of the first and second types of drive signals, thereby changing the settings into predefined ones for the first type of optical disc.

In this particular preferred embodiment, if the largest index value is greater than the first threshold value, the servo controller may change at least one of the first and second types of drive signals as an additional signal to further change the settings. The signal quality rater may measure at least one more index value as the settings are changed. And if the magnitude of variation from the largest one to the smallest one of the more than at least one index value is equal to or greater than a second threshold value, the optical disc drive may recognize the given optical disc as the second type. And the servo controller may change at least one of the drive signals of the first and second types, thereby changing the settings into ones to adopt when the given index value is the smallest one.

In a specific preferred embodiment, if the magnitude of variation from the largest index value to the smallest one is less than the second threshold value, the optical disc drive may recognize the given optical disc as the first type. The servo controller may change at least one of the drive signals of the first and second types, thereby changing the settings into ones for the first type of optical disc.

In another preferred embodiment, as for a variation in the focus position and a variation in the tilt to be determined by a combination of multiple settings, the variation to be determined by multiple settings to adopt when the given index value is the smallest one may be greater than the variation to be determined by multiple settings to adopt when the given index value is the largest one.

In yet another preferred embodiment, if the settings have been changed, the servo controller may change a tracking error signal setting based on the reflected light signal, and may adjust the tracking error signal.

In yet another preferred embodiment, the signal quality rater may measure, as the index value, at least one of a jitter value and a servo signal value to be obtained based on the reflected light signal.

In this particular preferred embodiment, the drive may be able to read data from both a compact disc, which is one of the optical disc of the first type, and a dual disc, which is one of the optical disc of the second type and which may include an information storage layer of a compact disc standard is recorded, and which may include an information storage layer compliant with a DVD standard.

An optical disc drive according to the present invention can determine whether or not the given optical disc is a type to produce a spherical aberration by changing the focus position and tilt settings. In addition, the spot size can be corrected by changing the focus position settings and the astigmatism, coma aberration and other non-spherical aberrations can be corrected by changing the tilt settings. In this manner, by changing those two parameters, good enough signal quality can be ensured.

Consequently, the optical disc drive of the present invention does not need any expensive and bulky mechanism including a spherical aberration correcting section for making spherical aberration correction, and therefore, can cut down the overall cost to make the drive.

Other features, elements, processes, steps, characteristics and advantages of the present invention will become more apparent from the following detailed description of preferred embodiments of the present invention with reference to the attached drawings.

Figure 4:
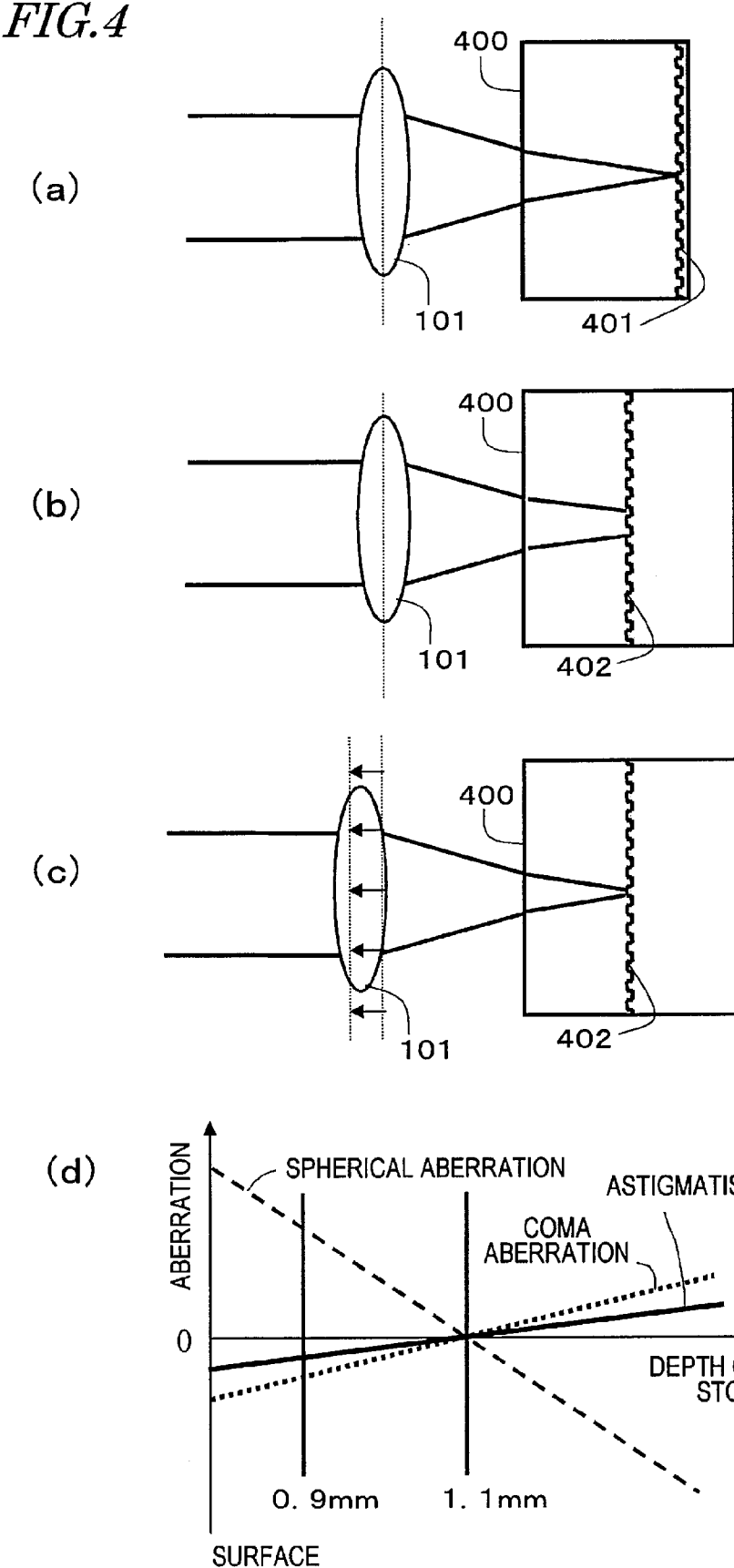

Portion (a) of FIG. 4 illustrates how a read operation is performed on a normal CD. Portion (b) of FIG. 4 illustrates what if a read operation is performed on the CD side of a dual disc without changing focus position settings for a normal CD. Portion (c) of FIG. 4 illustrates how a read operation is performed with the focus position settings changed such that the objective lens 101 is located farther away from the light incoming surface than the position shown in portion (b) of FIG. 4. And Portion (d) of FIG. 4 shows a relation between the depth of the information storage layer as measured from the surface and the magnitudes of various types of aberrations.

Figure 5A:
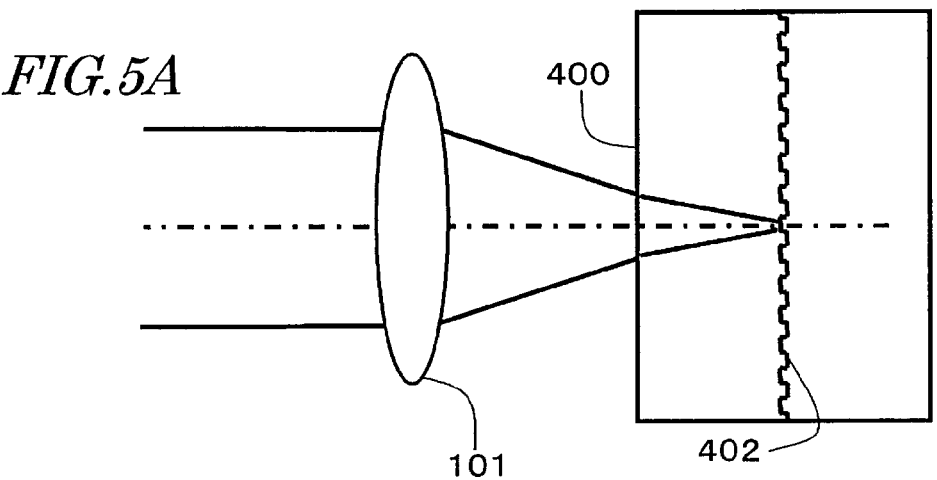
Figure 5B:
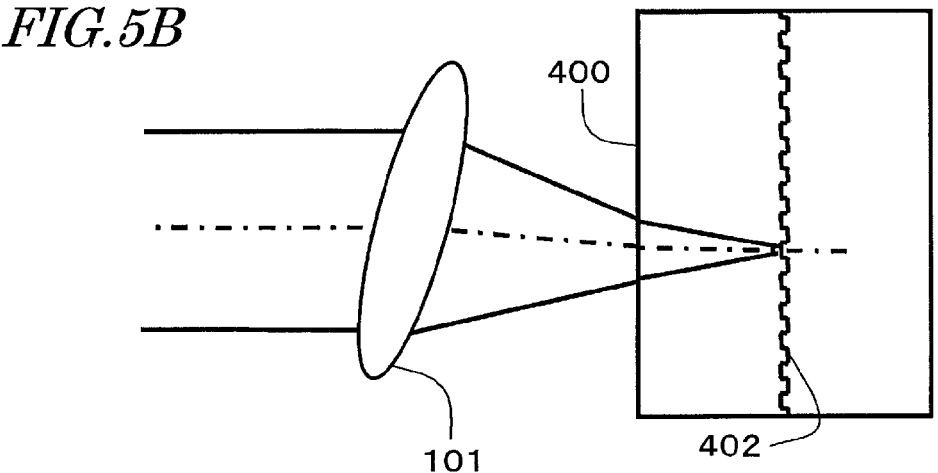
Figure 5C:
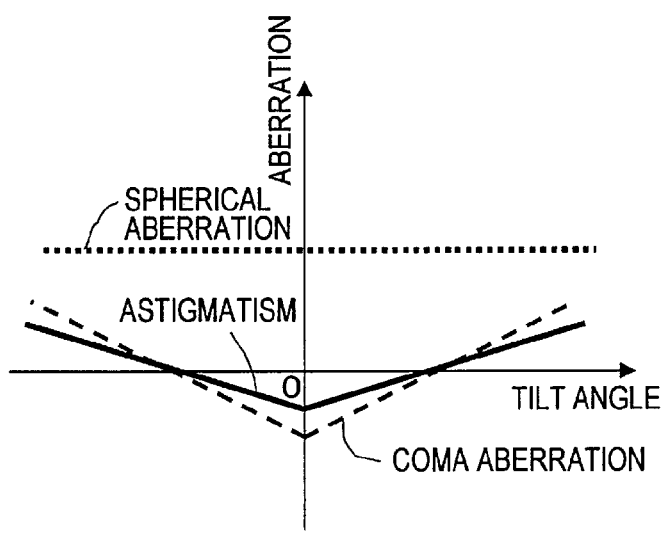

FIG. 5A illustrates how a read operation is performed on the CD side 402 of a dual disc when the focal point is located right on the CD side of the dual disc. FIG. 5B illustrates how a read operation may be performed on the CD side 402 of the dual disc with the focus position not changed from the one shown in FIG. 5A but with the objective lens 101 tilted. And FIG. 5C shows how much the respective types of aberrations will vary if the tilt settings are changed.

Figure 6:
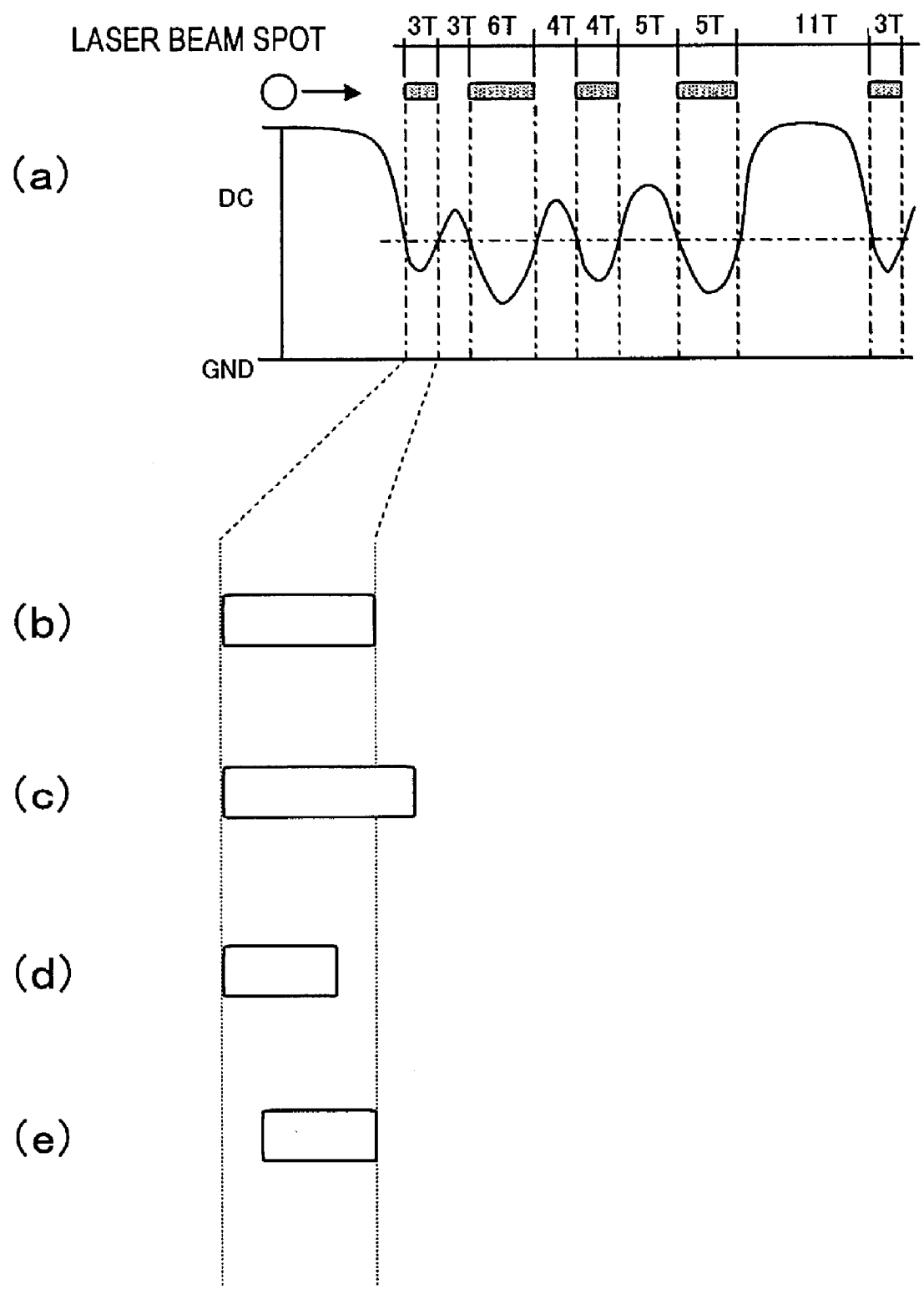

Portion (a) of FIG. 6 shows the waveform of an ideal read signal generated by scanning ideal pits. And portions (b) through (e) of FIG. 6 illustrate pits recorded in various states.

Figure 7A:
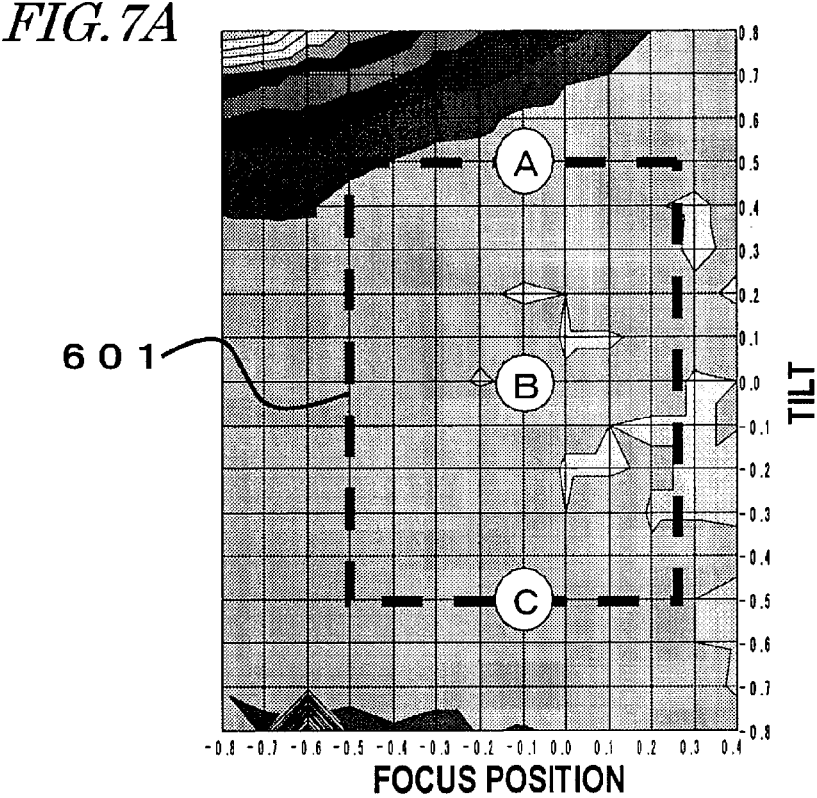
Figure 7B:
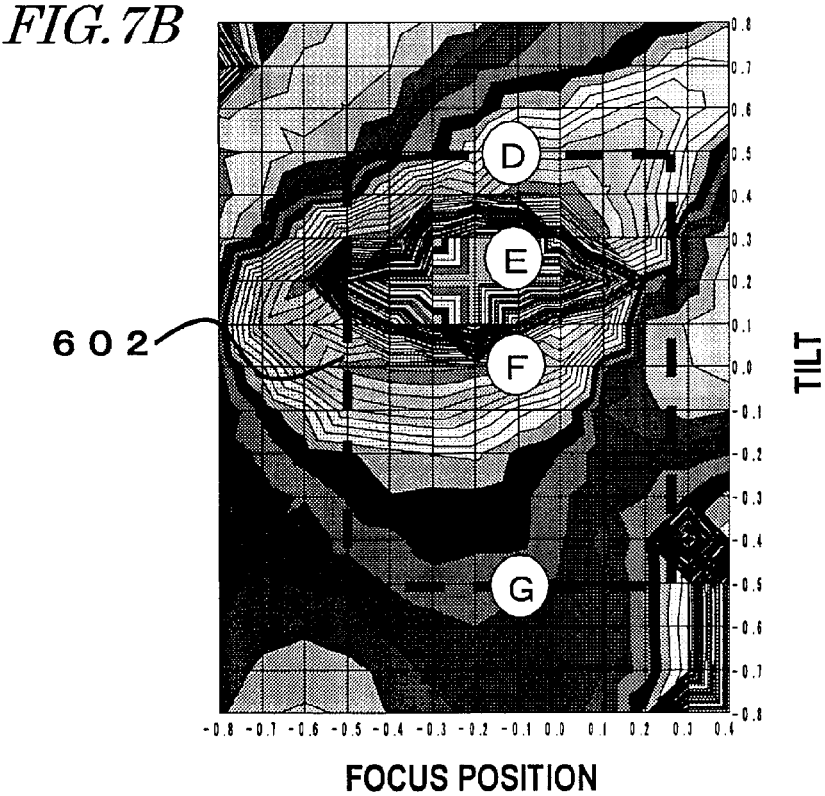

FIGS. 7A and 7B are graphs showing how the jitter value changes with the focus position and tilt settings in a normal CD and in a dual disc, respectively.

Figure 8A:
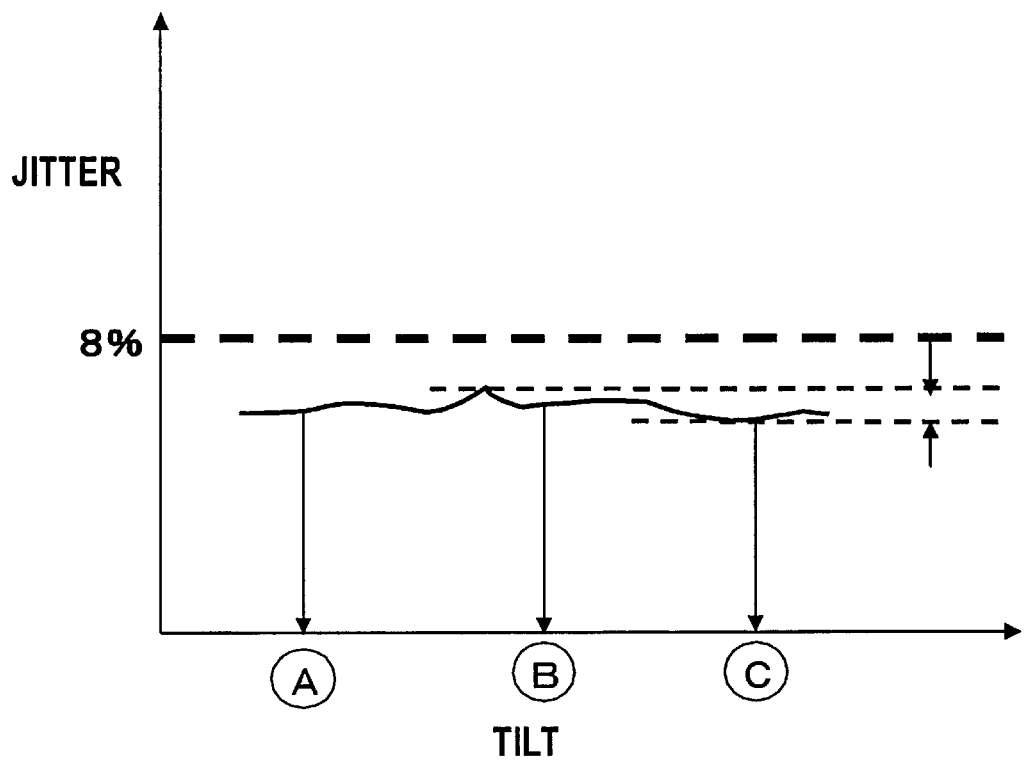
Figure 8B:
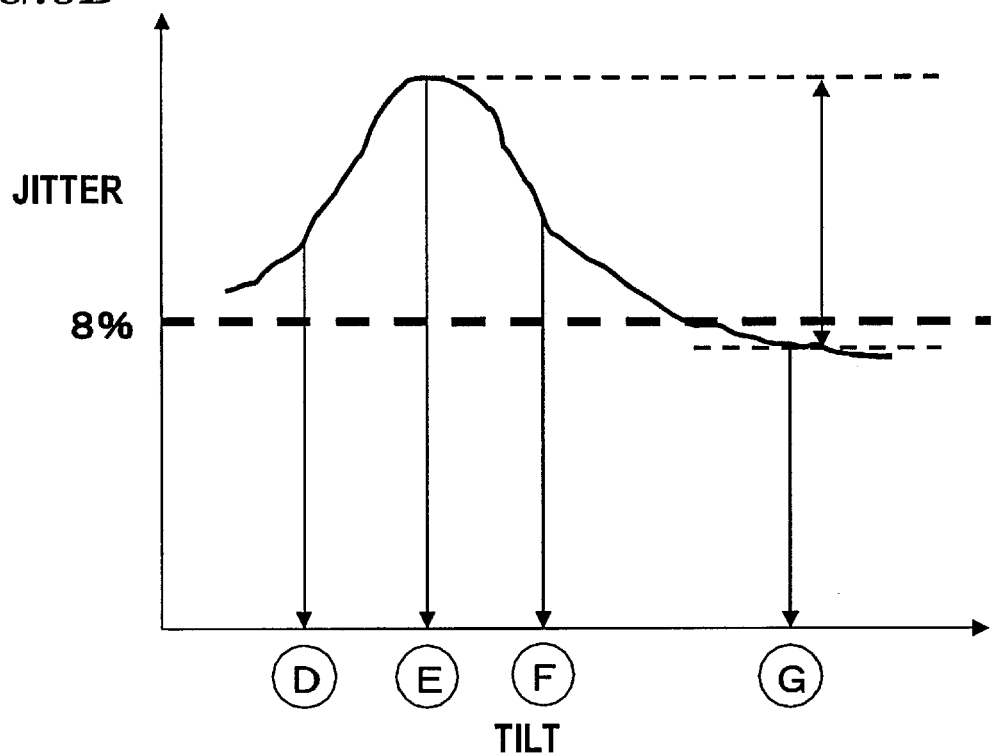

FIGS. 8A and 8B show how the jitter values change if the focus position setting is fixed at −0.1 μm in FIG. 7.

Figure 9:
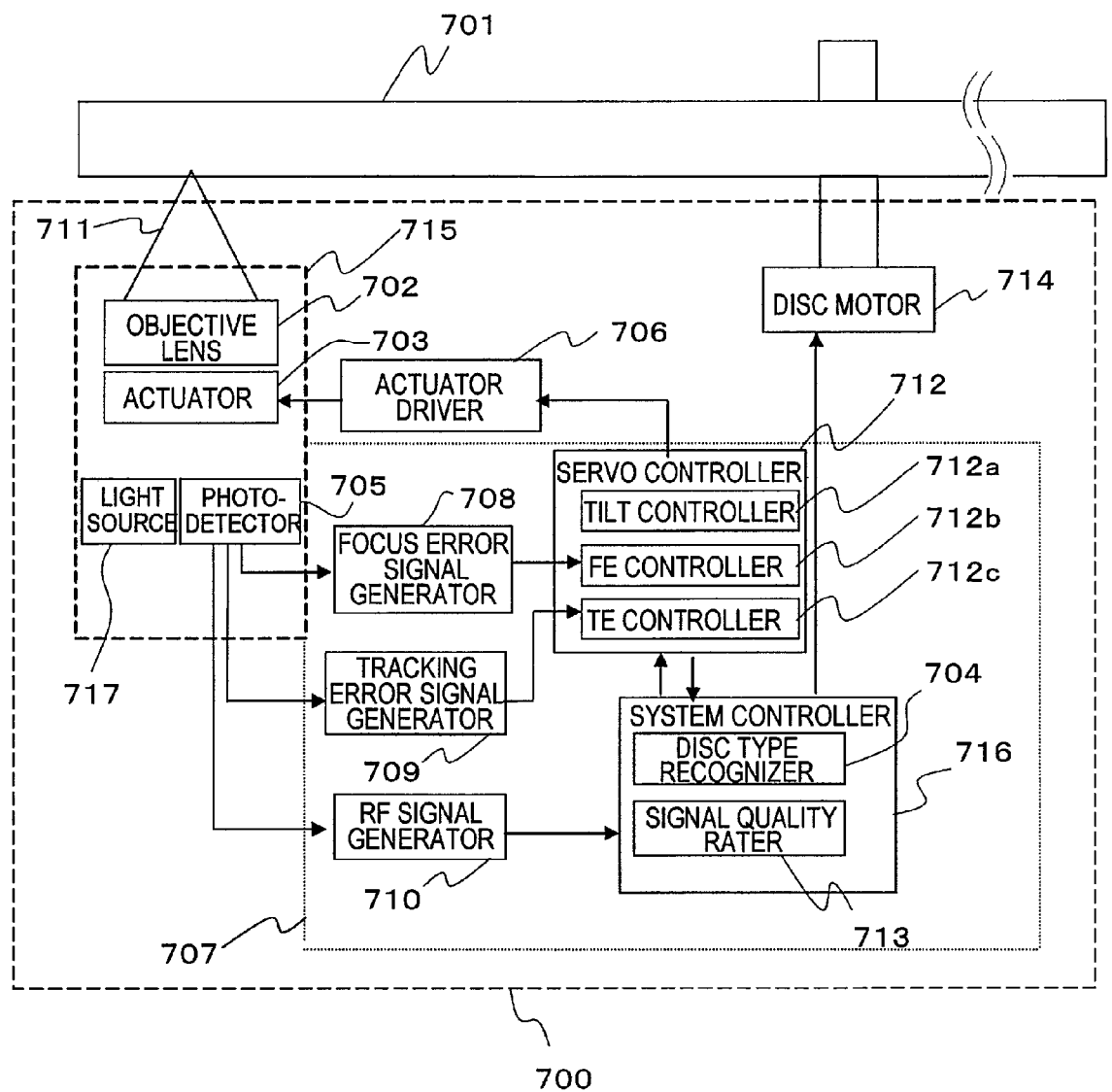

FIG. 9 illustrates the configuration of an optical disc drive 700 as a specific preferred embodiment of the present invention.

Figure 10:
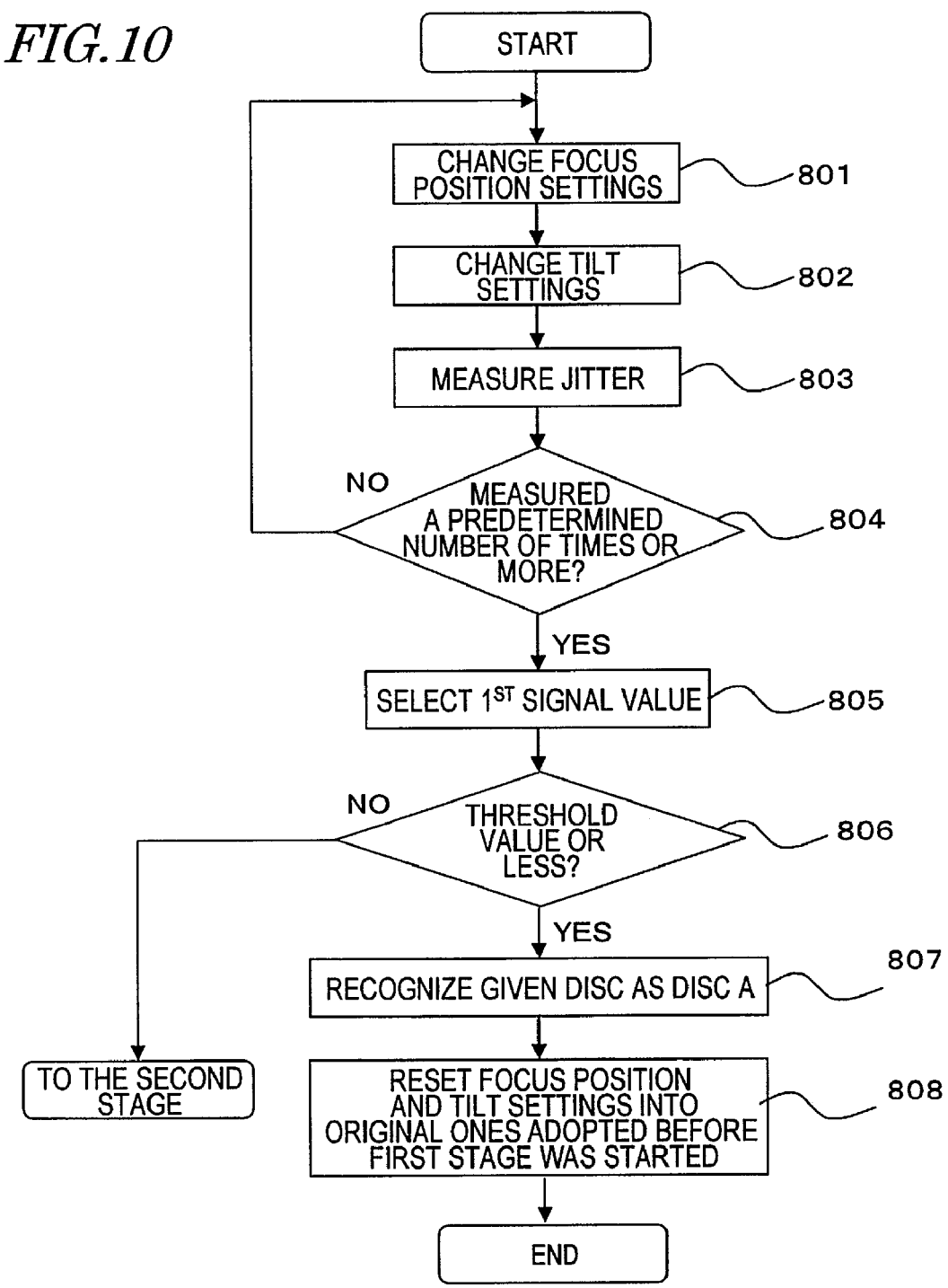

FIG. 10 shows the procedure of the first stage of a disc type recognition process between Discs A and B.

Figure 11:
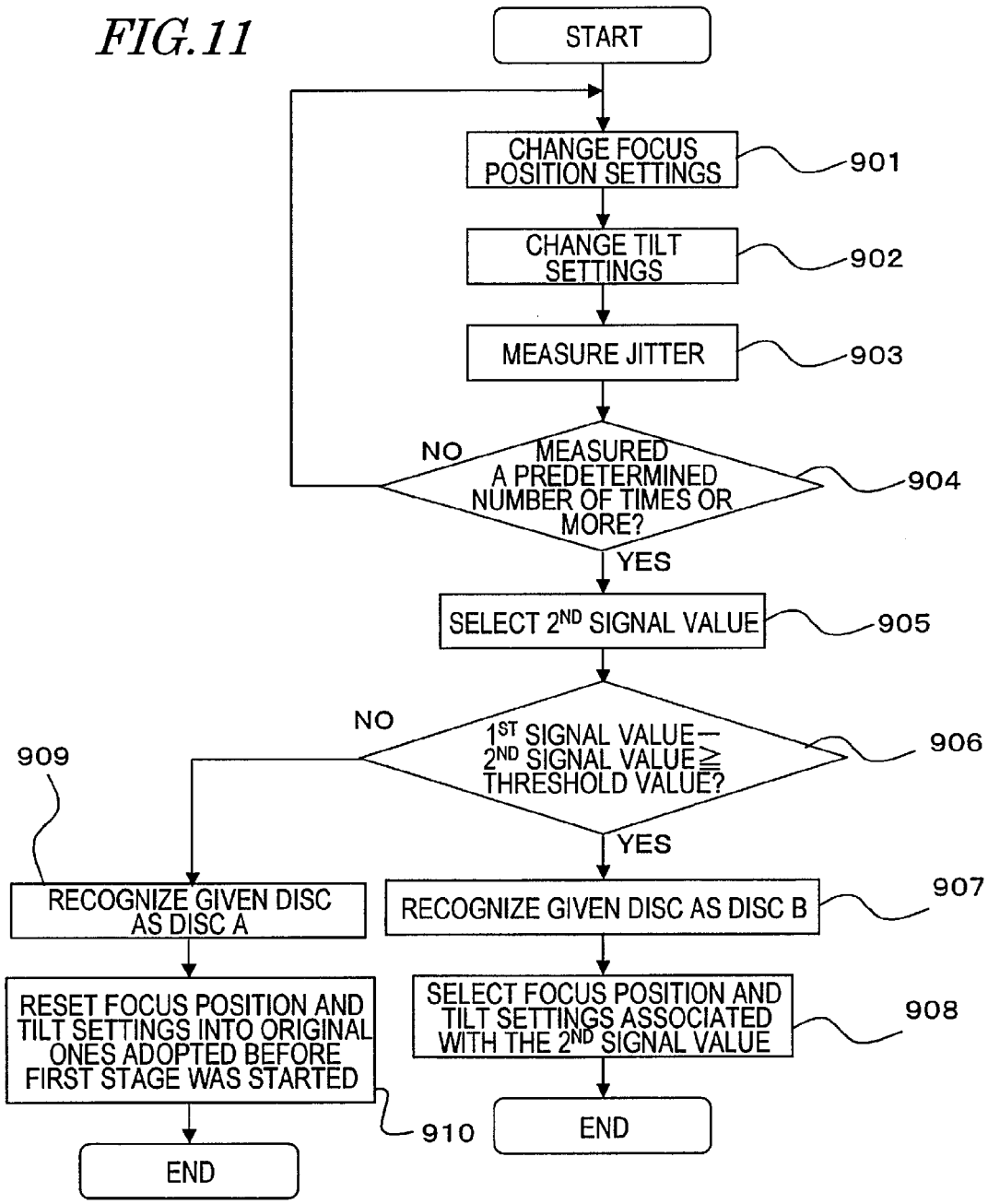

FIG. 11 shows the procedure of the second stage of the disc type recognition process between Discs A and B.

Figure 12:
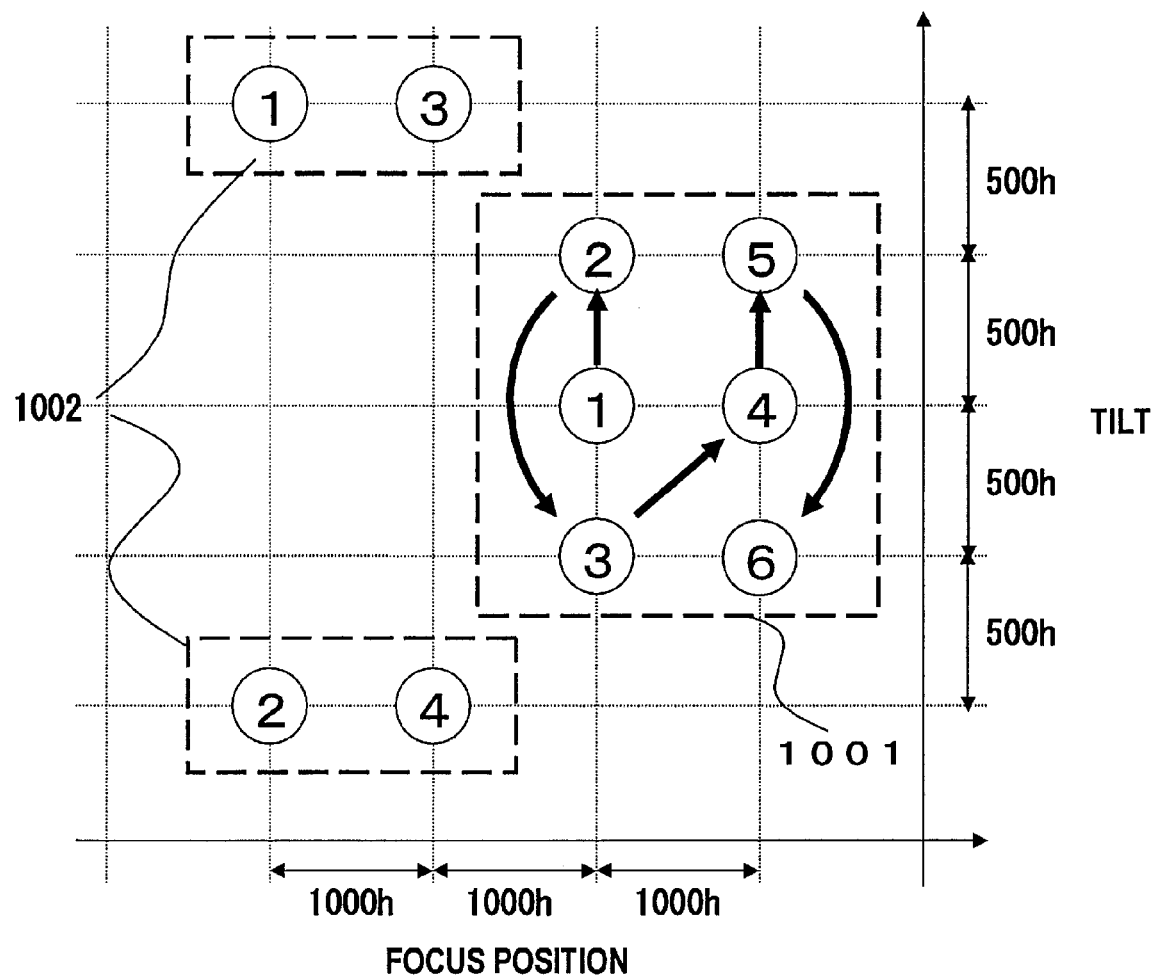

FIG. 12 shows six different combinations of focus position and tilt settings to be sequentially switched in FIG. 10 and four different combinations of focus position and tilt settings to be sequentially switched in FIG. 11.

DETAILED DESCRIPTION OF PREFERRED EMBODIMENTS

Hereinafter, preferred embodiments of an optical disc drive according to the present invention will be described.

Figure 1:
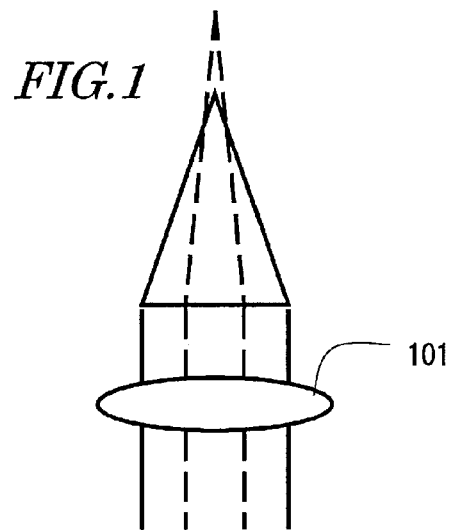
FIG. 1 illustrates a state where a spherical aberration has occurred.
Figure 2A:
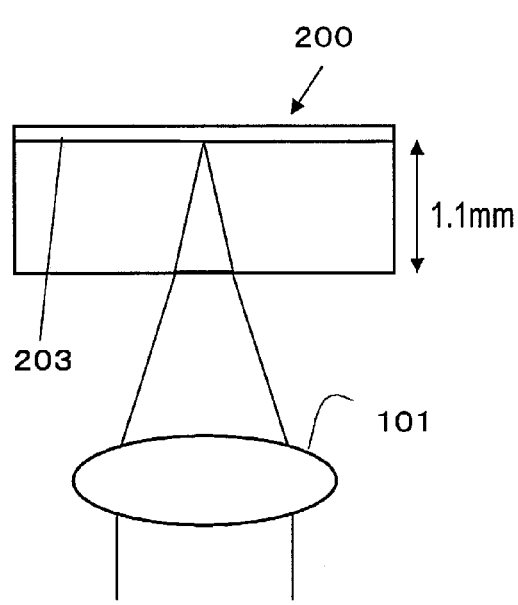
FIG. 2A illustrates how to read data from a CD 200 compliant with the CD standard.
Figure 2B:
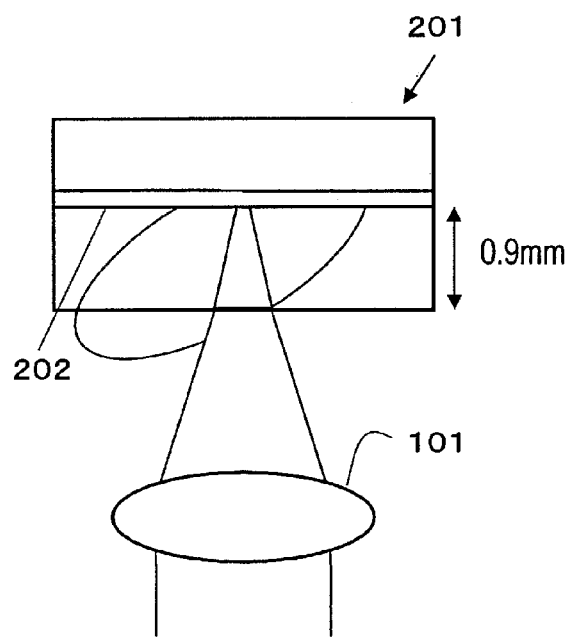
FIG. 2B illustrates how to read data from the CD side of a dual disc 201.
Figure 3A:
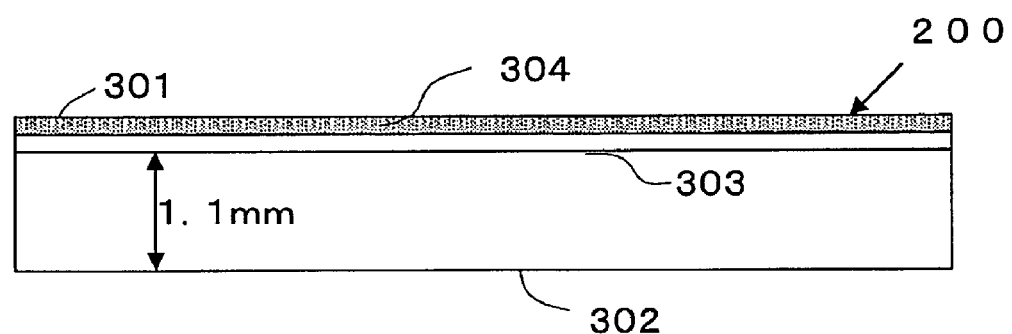
FIGS. 3A and 3B schematically illustrate cross sections of the CD 200 and the dual disc 201, respectively.
Figure 3B:
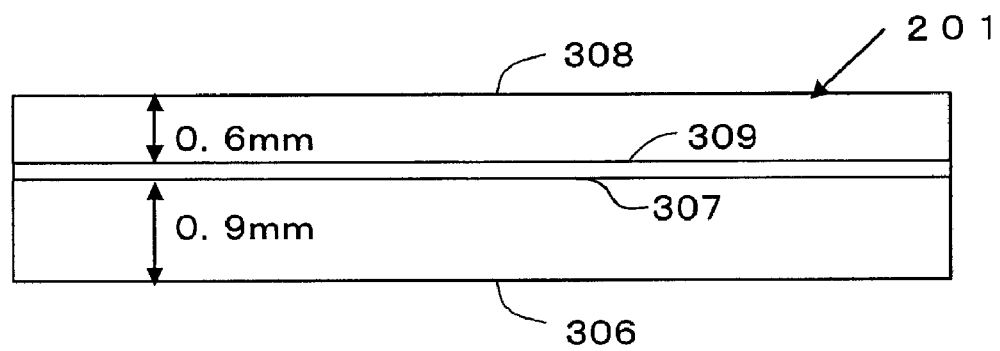

FIGS. 3A and 3B schematically illustrate cross sections of a compact disc (CD) 200 and a dual disc 201, respectively. The uneven surface structures including pits, grooves and so on and the reflective layer are not illustrated for the sake of simplicity.

The CD 200 shown in FIG. 3A has a surface 302 to transmit an incoming light beam (which will be simply referred to herein as a "disc surface") and a back surface (i.e., label side) 301 and includes at least one information storage layer 303 between those two surfaces. On the back surface 301 of the optical disc, arranged is a label layer 304 with titles, graphics, and so on printed. The CD 200 has an overall thickness of 1.2 mm and a diameter of 12 cm (which may also be 8 cm). In the CD 200, the information storage layer 303 is located at a depth of approximately 1.1 mm as measured from the disc surface 302. To read data from the information storage layer 303 of the CD 200, a near-infrared laser beam with a wavelength of approximately 785 nm needs to be converged and its focal point needs to be controlled so as to be located right on the information storage layer 303.

The dual disc 201 shown in FIG. 3B has a structure in which the respective back surfaces of a CD and a DVD have been bonded together, and has one surface 306 to transmit an incoming laser beam to read a CD and another surface 308 to transmit an incoming laser beam to read a DVD. These two surfaces will be both referred to herein as "light incoming surfaces". But the dual disc 201 has no layer corresponding to the label layer 304 of the CD 200.

The dual disc 201 has two information storage layers, which will be referred to herein as a "CD side 307" and a "DVD side 309", respectively. The CD side 307 is located at a depth of approximately 0.9 mm as measured from the one surface 306, while the DVD side 309 is located at a depth of approximately 0.6 mm as measured from the other surface 308.

The dual disc 201 and a normal CD have mutually different physical structures because the CD side 307 of the dual disc 201 is located at a shallower level than the information storage layer of a normal CD is. That is why if a control for adjusting the focal point toward the best focus position as is done on a normal CD were carried out on the CD side 307 of the dual disc, a spherical aberration, an astigmatism and a coma aberration would be produced, thus deteriorating the quality of the read or written data.

Hereinafter, the operating principle of an optical disc drive according to the present invention will be described with reference to FIGS. 4 and 5. According to the present invention, by changing the focus position and tilt settings, a good enough signal quality is ensured even for an optical disc that would produce a spherical aberration.

First, it will be described with reference to FIG. 4 how in principle an in-focus position can be corrected based on the focus position. Specifically, portion (a) of FIG. 4 illustrates how a read operation is performed on a normal CD. Portion (b) of FIG. 4 illustrates what if a read operation is performed on the CD side of a dual disc without changing focus position settings for a normal CD. And portion (c) of FIG. 4 illustrates how a read operation is performed with the focus position settings changed such that the objective lens 101 is located farther away from the light incoming surface than the position shown in portion (b) of FIG. 4.

In portion (a) of FIG. 4, the focal point is located right on the information storage layer 401. On the other hand, in portion (b) of FIG. 4, since the depth of the information storage layer 402 as measured from the surface is smaller than in portion (a) of FIG. 4, the focal point cannot be formed on the information storage layer 402 but the size of the light beam spot on the information storage layer 402 exceeds the track pitch.

Thus, in portion (c) of FIG. 4, by moving the objective lens 101 away from the light incoming surface 400, the focus position is set such that the focal point is located right on the information storage layer 402 (i.e., the CD side) of the dual disc. As a result, the size of the light beam spot on the information storage layer 402 decreases. By changing the focus positions in this manner, the influence of the adjacent track can be reduced and the signal quality improves.

However, on the supposition that the information storage layer is located at a depth of approximately 1.1 mm as measured from the surface, an optical pickup compliant with the CD standard is designed so as to minimize the aberration at that depth during a read/write operation. As described above, the dual disc has a different physical structure from the CD. Thus, due to the difference in the depth of the information storage layer as measured from the surface, the dual disc will produce a spherical aberration, an astigmatism and a coma aberration and may sometimes be unable to ensure good signal quality. Portion (d) of FIG. 4 shows a relation between the depth of the information storage layer as measured from the surface and the magnitudes of various types of aberrations. In the information storage layer located at a depth of approximately 1.1 mm as measured from the surface, those aberrations are minimized. On the other hand, in the information storage layer located at a depth of approximately 0.9 mm as measured from the surface, a spherical aberration, an astigmatism and a coma aberration are all produced.

Next, it will be described with reference to FIGS. 5A through 5C how in principle the aberration can be corrected by changing the tilt angles.

FIG. 5A illustrates how a read operation is performed on the CD side 402 of a dual disc when the focal point is located right on the CD side of the dual disc. This is a state corresponding to the one shown in portion (c) of FIG. 4. In this state, the objective lens 101 is not tilted with respect to the CD side 402, i.e., the objective lens 101 has no tilt at all.

On the other hand, FIG. 5B illustrates how a read operation may be performed on the CD side 402 of the dual disc with the focus position not changed from the one shown in FIG. 5A but with the objective lens 101 tilted.

And FIG. 5C shows how much the respective types of aberrations will vary if the tilt settings are changed. In FIG. 5C, the abscissa represents the tilt angle of the objective lens 101. It can be seen that if the tilt angles are changed into some setting, the spherical aberration will hardly change but the astigmatism and coma aberration can be reduced significantly.

As described above, by performing, in combination, the in-focus position correction by changing the focus position settings and the aberration correction by changing the tilt settings, those aberrations other than the spherical aberration can be reduced while performing the in-focus position correction. As a result, good signal quality can be ensured.

Hereinafter, it will be described how in principle the optical disc drive of the present invention recognizes the type of the given optical disc.

In this preferred embodiment, the type of the given optical disc is recognized using an index value called "jitter". Thus, first, it will be described with reference to FIG. 6 what the jitter is.

The jitter is one of index values for rating the quality of a read signal.

Read data can be obtained from an optical disc by binarizing an RF signal that has been generated by an optical pickup. One period of each piece of the binarized data should be an integral number of times as long as one period T of a read clock signal. That is why the transition point of the read signal obtained by scanning a pit that has been left on an optical disc (which will be referred to herein as a "pit edge") ideally agrees, on the time axis, with that of the original signal to be written.

Portion (a) of FIG. 6 shows the waveform of an ideal read signal generated by scanning ideal pits. As used herein, the "ideal pit" is a pit that starts and ends exactly at the intended locations and that has an exactly intended length such as 3T or 6T. For example, portion (b) of FIG. 6 illustrates an ideal 3T pit. In such an ideal pit, each transition point (or pit edge) of the read signal perfectly agrees, on the time axis, with the associated transition point of the original signal to be written.

Actually, however, pits are recorded in various manners. For instance, portion (c) of FIG. 6 illustrates an example in which a pit that should have a length of 3T has been recorded with an increased length of 3.3T. On the other hand, portions (d) and (e) of FIG. 6 illustrate examples in which a pit that should have a length of 3T has been recorded with a decreased length of 2.7T, for example, and in which the recording start or end point has shifted. The waveform of the read signal generated by scanning such a pit does not agree with that of the original signal and some error (i.e., a phase lead or phase lag) occurs at each transition point.

On top of that, one period of each piece of read data will fluctuate due to some manufacturing error or the influence of the characteristic of the optical pickup. That is to say, errors such as a phase lead or a phase lag will also occur at the transition point owing to aberrations, noise, focus position and other variations occurring inevitably during the disc manufacturing process.

And the standard deviation of that transition point error is represented as the "jitter". Thus, the smaller the jitter, the better the signal quality rated. On the other hand, as the jitter increases, the timing of detection of a rise or fall on a pit edge will shift more and more significantly. As a result, interference will occur with the signal representing the next pit, thus causing degradation in the quality of the read signal or a read error. It should be noted that a method for measuring the jitter has already been an established and known technique and a detailed description thereof will be omitted herein.

Next, the principle of recognizing the type of the given optical disc will be described.

FIGS. 7A and 7B are graphs showing how the jitter value changes with the focus position and with the tilt setting. Specifically, FIG. 7A shows the characteristic of a normal CD and FIG. 7B shows the characteristic of the CD side of a dual disc. The former characteristic can be called the jitter characteristic of an optical disc that would produce no spherical aberration, while the latter characteristic the jitter characteristic of an optical disc that would produce some spherical aberration. In each of FIGS. 7A and 7B, the abscissa represents the focus position and the ordinate represents the tilt. In this case, the focus positions are plotted with the direction in which the objective lens goes closer to the optical disc defined as positive direction and with the direction in which the objective lens moves away from the optical disc defined as negative direction.

In these graphs, the closed loops represent contour lines, which are plotted by connecting together multiple coordinate points (of focus positions and tilts) with the same magnitude of jitter. The inner the contour line is, the greater the jitter value and the worse the degradation of the characteristic.

The range 601 shown in FIG. 7A and the range 602 shown in FIG. 7B represent setting ranges to evaluate. Specifically, the points A, B and C within the range 601 shown in FIG. 7A represent jitter values to be obtained when only the tilt angles are changed with the focus position fixed, so are the points D, E, F and G within the range 602 shown in FIG. 7B. In FIG. 7B, the jitter value around the point E is the largest but the more distant from the point E, the smaller the jitter.

The points B and F represent jitter values to be obtained when the settings for focusing on the information storage layer of a normal CD are adopted. Once the in-focus state is established at the point B, the jitter value hardly changes even if the focus positions or tilt setting are varied around the point B. On the other hand, if the same settings are applied to the point F, the focal position will deviate from the point F due to a different depth of the information storage layer as measured from the surface. That is why if the focus positions or the tilt settings are changed, the jitter value will vary significantly in that case.

FIGS. 8A and 8B show how the jitter values change if the focus position setting is fixed at −0.1 μm in FIG. 7. Specifically, FIG. 8A is a graph showing how the jitter values change in a normal CD if the focus position setting is fixed at −0.1 μm in FIG. 7A. On the other hand, FIG. 8B is a graph showing how the jitter values change in the CD side of dual disc if the focus position setting is fixed at −0.1 μm in FIG. 7B.

As shown in FIG. 7A, there are no dense contour lines within the range 601. That is why there is no tilt setting that will change the jitter values significantly as shown in FIG. 8A. Consequently, with any settings between the points A and C, the resultant jitter value is less than 8%, below which good signal quality is supposed to be ensured. On the other hand, there are dense contour lines within the range 602 as shown in FIG. 7B, and therefore, the jitter changes significantly at some tilt setting as shown in FIG. 8B.

Taking these characteristics into consideration, it can be determined, by sensing how much jitter varies when either the focus positions or tilt settings are changed while the type of the optical disc being loaded is being recognized, for example, whether or not the optical disc loaded into the optical disc drive is an optical disc that would produce a spherical aberration (e.g., a dual disc with a CD side).

Specifically, if the jitter has varied significantly, then it can be determined that the optical disc drive is now loaded with a dual disc with a CD side. On the other hand, if such a variation has been hardly sensed, then the given disc can be recognized as a normal CD. In this manner, even if an optical disc that would produce a spherical aberration as shown in FIGS. 4 and 5 has been loaded, good signal quality can still be ensured by changing both the focus position and tilt settings.

Even when such a disc type recognition method is adopted, the variation in jitter produced could still be too small to distinguish a normal CD from the CD side of a dual disc just by changing only the focus positions OR the tilt settings for various reasons including the warp of the optical disc, the degree of the difference in the depth of the information storage layer as measured from the surface, and any other variation inevitably occurring during the optical disc drive manufacturing process. That phenomenon will occur if the focus positions are measured along the contour lines with the tilt setting fixed within the range 602 shown in FIG. 7B, for example. That is why according to the present invention, a method for sensing a jitter variation by changing the focus positions AND the tilt settings within the range 601 is adopted, which is one of the most important features of the present invention.

Hereinafter, the configuration and operation of an optical disc drive as a specific preferred embodiment of the present invention will be described.

First of all, the arrangement of functional blocks in the optical disc drive of this preferred embodiment will be described with reference to FIG. 9, which illustrates the configuration of an optical disc drive 700 as a specific preferred embodiment of the present invention.

The optical disc drive 700 of this preferred embodiment includes an actuator driver 706, a circuit section 707, a disc motor 714, and an optical pickup 715. The actuator driver 706 drives an actuator 703, which is arranged inside the optical pickup 715 as will be described later to adjust the position of an objective lens 702. As used herein, the "position of the objective lens 702" refers to not only the position of the objective lens 702 along a normal to the optical disc 701 but also the degree of tilt of the objective lens 702 with respect to the optical disc 701.

The circuit section 707 exchanges signals with the optical pickup 715. The disc motor 714 rotates the optical disc 701 loaded. And the optical pickup 715 optically accesses the optical disc 701. It should be noted that the optical disc 701 is illustrated in FIG. 9 just to make the operation of this optical disc drive 700 easily understandable and does not form part of the optical disc drive 700.

The optical pickup 715 may have any known configuration and may include a laser light source 717, the objective lens 702 and a photodetector 705, for example.

The laser light source 717 emits not only a light beam with a wavelength of approximately 785 nm to read and/or write information from/on a CD but also a light beam with a wavelength of approximately 655 nm to read and/or write information from a DVD. In FIG. 9, these light beams are collectively identified by the same reference numeral 711.

The objective lens 702 converges the light beam 711 that has been emitted from the laser light source 717 onto the optical disc 701. The photodetector 705 receives the light beam 711 that has been reflected from the optical disc 701 and converts it into an electrical signal, which will also be referred to herein as a "reflected light signal".

The circuit section 707 is also called an "optical disc controller" and may be implemented as a single circuit chip. However, such a configuration is just an example. For example, the same function can also be performed by providing a CPU (central processing unit) as a computer and a memory and by getting a computer program, which is stored in the memory to carry out the function of the circuit section 707 (to be described later), executed by the CPU.

The circuit section 707 includes a focus error signal generator 708, a tracking error signal generator 709, an RF signal generator 710, a servo controller 712 and a system controller 716.

The focus error signal generator 708 generates a focus error (FE) signal based on the electrical signal that has been supplied from the photodetector 705 and outputs the FE signal to the servo controller 712. The tracking error signal generator 709 generates a tracking error (TE) signal based on the electrical signal that has been supplied from the photodetector 705 and outputs the TE signal to the servo controller 712. And the RF signal generator 710 generates a read signal (RF signal) based on the electrical signal that has been supplied from the photodetector 705 and outputs the RF signal to the system controller 716.

The servo controller 712 includes a tilt controller 712a, an FE controller 712b and a TE controller 712c. Based on the FE signal supplied from the focus error signal generator 708 and the TE signal supplied from the tracking error signal generator 709, the servo controller 712 makes the FE controller 712b perform a focus servo control to keep the distance between the objective lens 702 and the information storage layer of the optical disc 701 constant and also makes the TE controller 712c perform a tracking servo control to have the laser beam spot follow the tracks on the optical disc 701. Also, the servo controller 712 supplies the FE and TE signals to the system controller 716. In accordance with the instruction given by the system controller 716, the tilt controller 712a controls the angle defined between the angle of incidence of the laser beam 717 and the surface of the optical disc 701. A control signal is supplied from the servo controller 712 to the actuator driver 706.

On receiving the control signal from the servo controller 712, the actuator driver 706 supplies a drive signal to the actuator 703 of the optical pickup 715, thereby driving the actuator 703. As a result, the position of the objective lens 702 can be adjusted.

The system controller 716 controls the overall system of the optical disc drive 700. The system controller 716 includes a disc type recognizer 704 and a signal quality rater 713. In response to an RF signal supplied from the RF signal generator 710, the system controller 716 makes a data reader (not shown in FIG. 9) read user data and also makes the signal quality rater 713 measure the jitter and other quantities. Furthermore, the system controller 716 makes the disc type recognizer 704 recognize the type of the given optical disc based on the FE and TE signals supplied from the servo controller 712 and on the result of measurement made by the signal quality rater 713.

In addition, the system controller 716 supplies a control signal to control the focus position of the objective lens 702 and a control signal to control the tilt representing the angle defined between the angle of incidence of the laser beam and the surface of the optical disc 701 to the servo controller 712. On top of that, the system controller 716 instructs the disc motor 714 to start and stop rotating and adjusts its rotational frequency, thereby controlling the rotation of the disc motor 714.

Hereinafter, it will be described with reference to not only FIG. 9 but also FIGS. 10 to 12 how to recognize the type of the given optical disc as either a normal CD (i.e., a disc that would produce no spherical aberration and will be referred to herein as "Disc A") or a dual disc with a CD side (i.e., a disc that would produce a spherical aberration and will be referred to herein as "Disc B").

FIG. 10 shows the procedure of the first stage of the disc type recognition process between Discs A and B, while FIG. 11 shows the procedure of the second stage thereof. FIG. 12 shows the six different combinations of focus position and tilt settings to be sequentially switched in FIG. 10 and the four different combinations of focus position and tilt settings to be sequentially switched in FIG. 11.

The procedure shown in FIG. 10 starts with a situation where the type of the given optical disc has been recognized as a normal CD (Disc A) by a known disc type recognition technique while the optical disc is being loaded into the optical disc drive. This means that the given optical disc has been recognized as neither a DVD nor a BD. By reference to the start point, the combination of focus position and tilt as indicated by setting #1 in the range 1001 shown in FIG. 12 is adopted. In this case, the focus position and the tilt are determined based on the settings that have been defined with respect to a CD, of which the depth of the information storage layer as measured from the surface is compliant with the standard, during the manufacturing process of the optical disc drive.

In the first stage of the disc type recognition process, it is determined whether or not the given optical disc is Disc A and a reference jitter value for use in the comparison processing step in the second stage of the disc type recognition process is obtained as a first signal value.

As already described about the principle of optical disc type recognition with reference to FIGS. 7 and 8, in a situation where the disc drive is loaded with Disc A, even if the focus position and/or tilt settings are changed within the range 1001, the jitter value will rarely exceed a threshold value of 8%, for example, below which good signal quality is ensured. That is why in this first stage of the disc type recognition process, first, it is determined whether or not the worst value of the jitters that have ever been measured with the focus position and tilt settings changed within the range 1001 is equal to or smaller than a threshold value of 8%, for example, thereby determining whether or not the given optical disc is Disc A.

If that worst value is equal to or smaller than the threshold value, then the given optical disc is recognized as Disc A. Otherwise, the worst jitter value will be regarded as a first signal value.

Hereinafter, the first stage of the disc type recognition process will be described in further detail with reference to FIGS. 9, 10 and 12.

The circuit section 707 changes the focus position settings in Step 801 and the tilt settings in Step 802. The focus position and tilt settings may also be changed in reverse order.

More specifically, these settings can be changed in the following manner. As shown in FIG. 9, the system controller 716 supplies control signals to change the focus positions and the tilts to the servo controller 712. In response to these control signals, the servo controller 712 controls the FE controller 712*b* and the tilt controller 712*a*.

The FE controller 712*b* moves the objective lens 702 along the optical axis, generates a drive signal (as a control signal) to change the convergence points of the light beam, and then supplies the drive signal to the actuator driver 706. Meanwhile, the tilt controller 712*a* generates a drive signal (as a control signal) to change the tilts of the objective lens 702 with respect to the optical disc 701 and supplies the drive signal to the actuator driver 706. On receiving these control signals from the FE controller 712*b* and the tilt controller 712*a*, the actuator driver 706 drives the actuator 703, thereby moving the objective lens 702.

These control signals generated by the FE controller 712*b* and the tilt controller 712*a* represent the focus position setting and the tilt setting, respectively. Specifically, the FE controller 712*b* and the tilt controller 712*a* determine the focus position and tilt settings by adding an offset to the settings for Disc A (i.e., the first combination of focus position and tilt settings shown in Table 1) as shown in the following Table 1:

TABLE 1

| Number of times | Focus position | Tilt |
|---|---|---|
| 1 | ±0000h | ±0000h |
| 2 | ±0000h | +0500h |
| 3 | ±0000h | −0500h |
| 4 | +1000h | ±0000h |
| 5 | +1000h | +0500h |
| 6 | +1000h | −0500h |

In Table 1, "h" added to the end of the magnitudes of change of the focus position and tilt represents that the value is a hexadecimal number. The focus position is supposed to have an offset of 0.25 μm at 1000 h, while the tilt is supposed to have an offset of 0.25 degrees at 500 h. In Table 1, the number of times of measurements is supposed to be six. However, the measurements may also be made any other number of times and any other values falling within certain ranges from the settings for Disc A may be used as the focus position and tilt settings.

The disc may tilt in either direction according to the degree of warp of the disc or some variation occurring during the manufacturing process of the optical disc drive. That is why the offsets to be added to the tilt settings may be both positive and negative ones.

On the other hand, the offsets to be added to the focus position settings are supposed to include positive ones that will shift the focus position closer to the disc than a normal focus position for a CD. This is because depending on the variation in the depth of the CD side (i.e., the information storage layer) of Disc B as measured from the surface or some variation occurring during the manufacturing process of the optical disc drive, good enough signal quality could be ensured even with normal focus position settings for a CD. Optionally, to cope with a disc, of which the information storage layer is located at a greater depth under the surface than a normal one, offsets to be added to the focus position settings may include negative ones.

Now take a look at FIG. 10 again. In Step 803, the signal quality rater 713 measures the jitter. Specifically, the RF signal generator 710 transforms the signal that has been received at the photodetector 705 into an RF signal, and the signal quality rater 713 of the system controller 716 obtains a jitter value based on the RF signal.

Next, in Step 804, the disc type recognizer 704 determines whether or not the jitter has been measured a predetermined number of times (e.g., six times) or more.

If the answer to the query of Step 804 is YES, the process advances to Step 805. Otherwise, the process goes back to the processing step 801 to perform the same series of processing steps all over again.

In Step 805, the disc type recognizer 704 selects, as a first signal value, the worst one of the jitters that have been measured in Step 803. Alternatively, the jitter value may also be selected from all jitter values measured but the best and worst ones or from only jitter values that satisfy a particular condition (e.g., fall within a predetermined range).

Next, in Step 806, the disc type recognizer 704 determines whether or not the first signal value is equal to or smaller than a threshold value. If the answer is YES, the process advances to Step 807. Otherwise, the process advances to the second stage of the disc type recognition process shown in FIG. 11. In this processing step, a jitter value that can be used to identify Discs A and B from each other (e.g., a jitter of 8%) may be used.

In Step 807, the disc type recognizer 704 recognizes the optical disc 701, which the optical disc drive 700 is now loaded with, as Disc A.

Finally, in Step 808, the system controller 716 sends a control signal to the servo controller 712, thereby resetting the focus position and tilt settings into the ones that were adopted before the first stage of the disc type recognition process was started. In this manner, settings for a normal CD are adopted.

The second stage of the disc type recognition process shown in FIG. 11 is carried out between Discs A and B if the first signal value is greater than the threshold value.

In this second stage of the disc type recognition process, it is determined whether the given optical disc is Disc A or Disc B. Unless the given optical disc has been recognized as Disc B, it is automatically recognized as Disc A. Such a decision is made because even if the given optical disc is actually Disc A, that disc could have too bad properties (e.g., could have a relatively big manufacturing error or a lot of dust) to be recognized correctly as such by the first stage of the disc type recognition process.

As already described about the principle of disc type recognition with reference to FIGS. 7 and 8, Disc B has focus position and tilt settings, which will result in jitter values that are smaller than the first signal value by at least a predetermined quantity, within the range shown in FIG. 12. That is why in this second stage of disc type recognition process, it is determined, by calculating the difference between the first signal value and the best one (which will be referred to herein as a "second signal value") of the jitter values that have been measured within the range 1002 with the focus position and tilt settings changed, whether or not the given optical disc is Disc B. As can be seen particularly easily from FIGS. 7A and 7B, among other things, if the focus position and tilt settings have been changed, Disc B will produce a bigger jitter difference than Disc A does. That is why if the difference is greater than the threshold value, the given optical disc is recognized as Disc B. Otherwise, the given optical disc is recognized as Disc A.

Hereinafter, the second stage of the disc type recognition process will be described in further detail with reference to FIGS. 9, 11 and 12.

The system controller 716 changes the focus position settings in Step 901 and the tilt settings in Step 902. In this case, the focus position and tilt settings are changed as shown in the following Table 2:

TABLE 2

| Number of times | Focus position | Tilt |
| --- | --- | --- |
| 1 | −2000h | +1000h |
| 2 | −2000h | −1000h |

As is clear from Table 1 and 2, the variations of the focus position and tilt to be determined by the second stage of the disc type recognition process are greater than those to be determined by the first stage of the disc type recognition process.

The disc may tilt in either direction according to the degree of warp of the disc or some variation occurring during the manufacturing process of the optical disc drive. That is why the offsets to be added to the tilt settings may be both positive and negative ones.

On the other hand, the offsets to be added to the focus position settings are supposed to include negative ones that will shift the focus position farther away from the disc than a normal focus position for a CD. This is because although the jitter value will not change as for Disc A, the in-focus position will be corrected and the jitter value will be reduced sufficiently as for Disc B in that case. Optionally, to cope with a disc, of which the information storage layer is located at a greater depth under the surface than a normal one, offsets to be added to the focus position settings may include positive ones, too.

The offsets to be added to the focus position and tilt settings shown in Table 2 are defined when the focus position and tilt settings for Disc A are supposed to be 0000 h. In Table 2, the jitter values are supposed to be measured only twice. However, the jitter values may also be measured any other number of times. Likewise, the focus position and tilt settings for this second stage of the disc type recognition process may also be any other values as long as those settings for Disc B are different from the ones for Disc A to such a degree as to distinguish Discs A and B from each other easily. For example, if with the combination of settings #1 or #2 within the range 1002, the tracking servo has lost too much stability to measure the jitter value, then the jitter value may be measured with the combination of settings #3 or #4 within the range 1002 and the second signal value may be selected from the jitter values falling within the combination of settings #3 or #4. Alternatively, the jitter values may be measured with the combinations of settings #1, #2, #3 and #4 within the range 1002 and the second signal value may be selected from the resultant four jitter values.

Next, in Step 903, the signal quality rater 713 measures the jitter.

Then, in Step 904, the signal quality rater 713 determines whether or not the jitters have been measured a predetermined number of times (e.g., twice in this example) or more. If the answer to the query of Step 904 is YES, the process advances to Step 905. Otherwise, the process goes back to Step 901 to perform the same series of processing step all over again.

In Step 905, the disc type recognizer 704 selects, as the second signal value, the best one of the jitter values that have been measured in Step 903. Alternatively, the jitter value may also be selected from all jitter values measured but the best and worst ones or from only jitter values that satisfy a particular condition (e.g., fall within a predetermined range).

Next, in Step 906, the disc type recognizer 704 determines whether or not the magnitude of variation from the first signal value into the second signal value is equal to or greater than a predetermined threshold value. In this processing step, the variation in jitter that is significant enough to distinguish Discs A and B from each other (e.g., a jitter of 5%) is used as the threshold value. If the answer to the query of Step 906 is YES, then the process advances to Step 907. Otherwise, the process advances to Step 909.

In Step 907, the disc type recognizer 704 recognizes the optical disc 701, which the optical disc drive 700 is now loaded with, as Disc B. Then, in Step 908, the system controller 716 selects and adopts the focus position and tilt settings that are associated with the second signal value from Table 2.

In Step 909, the disc type recognizer 704 recognizes the optical disc 701, which the optical disc drive 700 is now loaded with, as Disc A.

In that case, the focus position and tilt settings are reset in Step 910 into the ones that were adopted before the first stage of the disc type recognition process was started.

As described above, according to this preferred embodiment, the given optical disc can be recognized as either Disc A or Disc B based on the jitter values that have been measured with the focus position and tilt settings changed. And depending on the result of the decision, the focus position and tilt settings are optimized. After that, data is read from the given optical disc, of which the type is now known. Since the focus position and tilt have been optimized into the best ones for the type of the given optical disc, a read signal of quality can be obtained.

If the answers to the queries of Steps 804 and 904 shown in FIGS. 10 and 11 are NO and even if the setting are changed, the FE controller 712*b* and the tilt controller 712*a* do not have to change both of the control signals in accordance with the changes of the setting. But at least one of these two controllers 712*b* and 712*a* needs to change a control signal. For instance, in the example shown in Table 1 about the processing step 804 shown in FIG. 10, the focus position does not change from the first time of measurement through the third time and from the fourth time of measurement through the sixth time. That is why when the settings are changed for the second and third times, the FE controller 712*b* does not have to change any control signal but only the tilt controller 712*a* needs to change one and send it to the actuator driver 706. If the settings are changed in a different order from the one shown in Table 1, only the FE controller 712*b* needs to change a control signal but the tilt controller 712*a* does not have to change any. The same statement applies to the example shown in Table 2 about the processing step 904 shown in FIG. 11.

It should be noted that preferred embodiments of the present invention have been described just by way of illustrative examples. That is to say, the present invention is in no way limited to those preferred embodiments.

In the preferred embodiments described above, the present invention is supposed to be applied to recognizing the given optical disc as either a dual disc or a CD. Alternatively, the same technique is applicable to distinguishing a normal CD from a CD that would produce a spherical aberration because its information storage layer is located at a different depth under the surface from the standard one. Still alternatively, the present invention is also applicable to any other optical system, not just the optical system for CDs, to distinguish a normal DVD from a DVD that would produce a spherical aberration because its information storage layer is located at a different depth under the surface from the standard one or to distinguish a BD to produce a spherical aberration from a normal one. Furthermore, the present invention is also applicable to a single-sided, dual-layer hybrid disc (such as a disc in which a BD and an HD-DVD are bonded together) in order to distinguish the BD and the HD-DVD sides from each other. In such a hybrid disc, both the BD and HD-DVD sides can be played with the same optical system and their information storage layers are located at mutually different depths as measured from the surface. That is why the disc type recognition method of the present invention is effectively applicable to such a hybrid disc.

Furthermore, in the preferred embodiment described above, the jitter is supposed to be used as an index to signal quality during the disc type recognition process. Alternatively, any other read signal (such as an RF signal) or a servo signal (such as a focus error signal or a tracking error signal) may also be used.

Also, in the first and second stages of the disc type recognition process, the jitter is supposed to be measured under multiple conditions. However, the jitter could also be measured under only one condition.

It should be noted that the "tilt" that has been described in the preferred embodiments of the present invention could be one or both of a lens tilt, which is defined by tilting the objective lens to change its relative angle with respect to the disc, and a mechanical tilt, which is defined by tilting the optical pickup itself to change its relative angle with respect to the disc.

Optionally, if the focus position and/or the tilt settings have been changed, the servo readjustment (such as the adjustment of the amplitude of the tracking error signal or the adjustment of the balance of the tracking error signal) may be carried out.

An optical disc drive according to the present invention can determine whether or not the given optical disc is a type that would produce a spherical aberration and can ensure high signal quality without changing the designs of a mechanism for correcting the spherical aberration. As a result, the present invention is applicable to an optical disc drive that is compatible with various types of optical discs and to an electronic device including such an optical disc drive without significantly increasing the cost.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-276210 filed on Oct. 24, 2007 and No. 2008-271564 filed on Oct. 22, 2008, the entire contents of which are hereby incorporated by reference.

What is claimed is:

1. An optical disc drive having an ability to read data from any of multiple types of optical discs, of which the respective information storage layers are located at mutually different depths as measured from their surface, the drive comprising:
   a light source for emitting a light beam;
   a lens for converging the light beam;
   a photodetector, which receives the light beam that has been reflected from the information storage layer of a given optical disc and outputs a reflected light signal;
   a servo controller for generating a first type of drive signal to adjust a focus position by changing distances from the lens to the optical disc and a second type of drive signal to adjust tilt of the lens by changing angles defined by the lens with respect to the optical disc; and a signal quality rater for measuring an index value based on the reflected light signal to rate the quality of the reflected light signal, wherein when the drive is loaded with the optical disc, the servo controller changes multiple drive signals of the first and/or second type(s), thereby changing settings to be defined by a combination of the focus position and the tilt, and wherein the signal quality rater measures multiple index values as the settings are changed, and wherein the drive recognizes the type of the given optical disc by the multiple index values and reads data from the optical disc recognized.

2. The optical disc drive of claim 1, wherein the multiple types of optical discs include a first type of optical disc, which is standardized, and a second type of optical disc, and wherein in a situation where the smaller the index value, the higher the rating of the signal quality, if a largest one of the index values measured is equal to or smaller than a first threshold value, the optical disc drive recognizes the given optical disc as the first type, and the servo controller changes at least one of the first and second types of drive signals, thereby changing the settings into predefined ones for the first type of optical disc.

3. The optical disc drive of claim 2, wherein if the largest index value is greater than the first threshold value, the servo controller changes at least one of the first and second types of drive signals as an additional signal to further change the settings, and the signal quality rater measures at least one more index value as the settings are changed, and wherein if the magnitude of variation from the largest one to the smallest one of the more than at least one index value is equal to or greater than a second threshold value, the optical disc drive recognizes the given optical disc as the second type, and the servo controller changes at least one of the drive signals of the first and second types, thereby changing the settings into ones to adopt when a given index value is the smallest one.

4. The optical disc drive of claim 3, wherein if the magnitude of variation from the largest index value to the smallest one is less than the second threshold value, the optical disc drive recognizes the given optical disc as the first type, and the servo controller changes at least one of the drive signals of the first and second types, thereby changing the settings into ones for the first type of optical disc.

5. The optical disc drive of claim 3, wherein as for a variation in the focus position and a variation in the tilt to be determined by a combination of multiple settings, the variation to be determined by multiple settings to adopt when the given index value is the smallest one is greater than the variation to be determined by multiple settings to adopt when the given index value is the largest one.

6. The optical disc drive of claim 1, wherein if the settings have been changed, the servo controller changes a tracking error signal setting based on the reflected light signal, and adjusts the tracking error signal.

7. The optical disc drive of claim 4, wherein the signal quality rater measures, as the index value, at least one of a jitter value and a servo signal value to be obtained based on the reflected light signal.

8. The optical disc drive of claim 2, wherein the drive is able to read data from both a compact disc, which is one of the optical disc of the first type, and a dual disc, which is one of the optical disc of the second type and which includes an information storage layer, on which data of a compact disc is recorded, and which includes an information storage layer compliant with a DVD standard.

* * * * *